United States Patent
Col et al.

(10) Patent No.: US 6,427,207 B1
(45) Date of Patent: Jul. 30, 2002

(54) RESULT FORWARDING CACHE

(75) Inventors: Gerard M. Col; G. Glenn Henry, both of Austin, TX (US)

(73) Assignee: I.P. First L.L.C., Fremont, CA (US)

( * ) Notice: Subject to any disclaimer, the term of this patent is extended or adjusted under 35 U.S.C. 154(b) by 0 days.

(21) Appl. No.: 09/909,535

(22) Filed: Jul. 20, 2001

Related U.S. Application Data (63) Continuation of application No. 09/314,176, filed on May 18, 1999, now Pat. No. 6,343,359.

(51) Int. Cl.[7] .......................... G06F 9/305; G06F 9/312; G06F 9/345; G06F 9/38; G06F 9/44

(52) U.S. Cl. .................. 712/245; 712/217; 712/225; 712/228; 712/219; 712/240; 712/237; 712/248; 712/218; 711/123; 711/125; 711/144; 711/169; 711/204; 711/137

(58) Field of Search .................. 712/203.25, 201, 712/240, 202, 245, 206, 248, 207, 237, 210, 213, 123, 211, 228, 217, 218, 215, 219, 225; 711/123, 137, 125, 144, 169, 204, 213

(56) References Cited

U.S. PATENT DOCUMENTS

| | | |
|---|---|---|
| 4,924,469 A | 5/1990 | Tamaru |
| 5,404,551 A | 4/1995 | Katsuno |
| 5,463,745 A | 10/1995 | Vidwans et al. |
| 5,537,560 A | 7/1996 | Boggs et al. |
| 5,809,536 A * | 9/1998 | Young et al. ................ 711/144 |
| 6,108,769 A | 8/2000 | Chinnakonda et al. |
| 6,112,293 A | 8/2000 | Witt |

* cited by examiner

*Primary Examiner*—Daniel H. Pan
(74) *Attorney, Agent, or Firm*—Richard K. Huffman; James W. Huffman (57) ABSTRACT

An apparatus is presented for expediting the execution of dependent micro instructions in a pipeline microprocessor having design characteristics-complexity, power, and timing—that are not significantly impacted by the number of stages in the microprocessor's pipeline. In contrast to conventional result distribution schemes where an intermediate result is distributed to multiple pipeline stages, the present invention provides a cache for storage of multiple intermediate results. The cache is accessed by a dependent micro instruction to retrieve required operands. The apparatus includes a result forwarding cache, result update logic, and operand configuration logic. The result forwarding cache stores the intermediate results. The result update logic receives the intermediate results as they are generated and enters the intermediate results into the result forwarding cache. The operand configuration logic accesses the intermediate results and to configure and provide the operands that are required by dependent micro instructions.

17 Claims, 6 Drawing Sheets

*Utilization of Interlock Logic to Execute a Dependent Micro Instruction*

| Cycle | Translate | Register | Address | Data/ALU | Write Back |
|-------|-----------|----------------|----------------|----------------|----------------|
| 1 | MAC1 | *** | *** | *** | *** |
| 2 | MAC2 | MIC1 D1,S2,S3 | *** | *** | *** |
| 3 | *** | slip | MIC1 D1,S2,S3 | *** | *** |
| 4 | *** | slip | slip | MIC1 D1,S2,S3 | *** |
| 5 | *** | slip | slip | slip | MIC1 D1,S2,S3 |
| 6 | *** | MIC2 D4,S1,S5 | slip | slip | slip |
| 7 | *** | *** | MIC2 D4,S1,S5 | slip | slip |
| 8 | *** | *** | *** | MIC2 D4,S1,S5 | slip |
| 9 | *** | *** | *** | *** | MIC2 D4,S1,S5 |

— operand register for MIC2 (register 1) is the destination register for MIC1

— interlock logic inserts slips in pipeline to preclude MIC2 from proceding until result of MIC1 is written to register 1

3 cycles

FIG. 3 (Related Art)

*Pipeline Microprocessor With Result Distribution Bus* /300

FIG. 4 (Related Art) /400

*Utilization of Result Distribution Bus to Execute Dependent Micro Instructions*

| Cycle | Translate | Register | Address | Data/ALU | Write Back |
|---|---|---|---|---|---|
| 1 | MAC1 | *** | *** | *** | *** |
| 2 | NOP | MIC1 D1,S2,S3 | *** | *** | *** |
| 3 | MAC2 | NOP | MIC1 D1,S2,S3 | *** | *** |
| 4 | MAC3 | MIC2 D4,S1,S5 | NOP | MIC1 D1,S2,S3 | *** |
| 5 | *** | MIC3 D5,S8,S1 | MIC2 D4,S1,S5 | NOP | MIC1 D1,S2,S3 |
| 6 | *** | *** | MIC3 D5,S8,S1 | MIC2 D4,S1,S5 | NOP |
| 7 | *** | *** | *** | MIC3 D5,S8,S1 | MIC2 D4,S1,S5 |
| 8 | * | * | * | * | MIC3 D5,S8,S1 | result destined for register 1 routed over bus to all previous stages; MIC2 and MIC3 pick off result FIG. 5 (Related Art)

Logic Required to Employ Result Distribution Bus

Utilization of Result Forwarding Cache to Execute a Dependent Micro Instruction 800

| Cycle | Translate | Register | Address | Load | Align | Execute | Store | Write Back |
|---|---|---|---|---|---|---|---|---|
| 1 | MAC1 | *** | *** | *** | *** | *** | *** | *** |
| 2 | MAC2 | MIC1 D1,S2,S3 | *** | *** | *** | *** | *** | *** |
| 3 | NOP | MIC2 D4,S2,S3 | MIC1 D1,S2,S3 | *** | *** | *** | *** | *** |
| 4 | NOP | NOP | MIC2 D4,S2,S3 | MIC1 D1,S2,S3 | *** | *** | *** | *** |
| 5 | MAC3 | NOP | NOP | MIC2 D4,S2,S3 | MIC1 D1,S2,S3 | *** | *** | *** |
| 6 | *** | MIC3 D7,Ŝ1,Ŝ4 | NOP | NOP | MIC2 D4,S2,S3 | MIC1 D1,S2,S3 | *** | *** |
| 7 | *** | *** | MIC3 D7,Ŝ1,Ŝ4 | NOP | NOP | MIC2 D4,S2,S3 | MIC1 D1,S2,S3 | *** |
| 8 | *** | *** | *** | MIC3 D7,Ŝ1,Ŝ4 | NOP | NOP | MIC2 D4,S2,S3 | MIC1 D1,S2,S3 |
| 9 | *** | *** | *** | *** | MIC3 D7,Ŝ1,Ŝ4 | NOP | NOP | MIC2 D4,S2,S3 |
| 10 | *** | *** | *** | *** | *** | MIC3 D7,S1,S4 | NOP | NOP |
| 11 | *** | *** | *** | *** | *** | *** | MIC3 D7,S1,S4 | NOP |
| 12 | *** | *** | *** | *** | *** | *** | *** | MIC3 D7,S1,S4 |

- result destined for register 1 written to RFC
- result destined for register 4 written to RFC
- RFC accessed to retrieve correct operands corresponding to register 1 and register 4

RESULT FORWARDING CACHE

CROSS-REFERENCE TO RELATED APPLICATIONS

This application is a continuation of U.S. patent application Ser. No. 09/314,176 entitled, Result Forwarding Cache, having a common assignee, common inventors, and filed on May 18, 1999, now U.S. Pat. No. 6,343,359.

BACKGROUND OF THE INVENTION

1. Field of the Invention

This invention relates in general to the field of instruction execution in computers, and more particularly to an apparatus in a pipeline microprocessor for providing results of recently executed micro instructions to dependent micro instructions.

2. Description of the Related Art

A microprocessor has an instruction pipeline that sequentially executes instructions from an application program in synchronization with a microprocessor clock. The instruction pipeline is divided into stages, each of which performs a specific task that is part of an overall operation that is directed by a programmed instruction. The programmed instructions in a software application program are executed in sequence by the microprocessor. As an instruction enters the first stage of the pipeline, certain tasks are accomplished. The instruction is then passed to subsequent stages for accomplishment of subsequent tasks. Following completion of a final task, the instruction completes execution and exits the pipeline. Execution of programmed instructions by a pipeline microprocessor is very much analogous to the manufacture of items on an assembly line.

Early pipeline microprocessors were not sophisticated enough to have multiple instructions executing in different pipeline stages at the same time. Consequently, a given instruction would be fetched from memory and would proceed through the various pipeline stages until it completed execution. Following this, a next instruction would proceed through the various stages through completion. And because early pipeline microprocessors had only a few pipeline stages, the inefficient utilization of stage resources was not deemed to be significant.

As uses for microprocessors started to proliferate, more stringent requirements began to be imposed, particularly with respect to speed. And the obvious approach for increasing processing speed was to allow multiple instructions to simultaneously proceed down the pipeline at the same time. Clearly, this change increased instruction throughput because resources within each pipeline stage were more efficiently used. But with this change came a problem: What if one instruction executing in an early pipeline stage required a result that was yet to be provided by another instruction executing in a later pipeline stage? This situation is common to software programs; instructions that are close in proximity tend to perform tasks using the same operand. For example, a control algorithm may compute a true error signal value by adding a small number to a current error signal value and then comparing this value to some other signal that is input to the microprocessor. The structure of the algorithm is to add a first operand to a second operand to produce a result. The result is then tested to see if the computed value is tolerable. If not, then the first operand is added to the computed result to obtain a second result. The second result is tested. And so on. Even in this simple algorithm it is evident that every other instruction utilizes the last computed result. When a given instruction executing in one stage of the pipeline requires a result that is to be provided by another instruction executing in a subsequent stage of the pipeline, the given instruction is referred to as a dependent instruction. This is because the operand required by the dependent instruction depends upon generation of the result by the other instruction.

To deal with dependent instructions, microprocessor designers added interlock logic to existing pipeline designs. The interlock logic spanned the stages of a microprocessor where the dependency situation could occur. During normal operation, non-dependent instructions were successively advanced through the pipeline stages in synchronization with the clock. When the interlock logic encountered a dependent instruction, it simply stalled execution of the dependent instruction by inserting slips into the pipeline, until the result required by the dependent instruction was generated and made available for retrieval as an operand.

In spite of the advances provided through interlock logic, demands for faster throughput continued to press microprocessor designers. Consequently, an alternative to interlock logic was developed that allowed dependent instructions to proceed down the pipeline without incurring slips. This alternative is known as a result distribution bus, or a bypass bus, or a result forward bus. In essence, the result distribution bus originates at the stage of the pipeline in which results are generated. When a result is generated, it is copied to the bus and then routed to all of the earlier stages that are affected by dependent instructions. If a dependent instruction is present within any of the earlier stages, then logic within that stage performs all of the operations necessary to properly configure the required operand from the provided result. The result distribution approach can be thought of as a one-to-many distribution scheme because one result can be distributed to several dependent instructions at the same time.

The result distribution scheme has prevailed as the principal technique for expediting the execution of dependent instructions, that is, until more recent times when demands for further throughput increases have compelled microprocessor designers to substantially alter the design of stages within the pipeline. These alterations to the pipeline can be comprehended through use of an assembly line analogy. Suppose an assembly line is set up with three stages, where each of the three stages is required to insert two screws in a product that flows down the line, for a total of six screws. Further suppose that the time required to insert a screw is one minute. To send a product through the assembly line, then, requires six minutes. If multiple products are sent down the line, then it follows that one product rolls off the line every two minutes.

A simple enhancement to the line will double the production throughput: Reconfigure the line into six stages, where each stage is required to insert only one screw. While with this architectural change it still takes six minutes to pass a product through the line, the improvement now is that one product rolls off of the line every minute. The speed and throughput are doubled by doubling the number of stages and halving the operations performed in each stage.

To improve the throughput of current microprocessors, designers are taking the very same approach: pipeline stages are being added and the functional requirements for each stage are being decreased. Thus, faster clock speeds can be applied and instruction throughput is increased.

But increasing the number of pipeline stages has highlighted a deficiency with the result distribution technique for dealing with dependent instructions. Whereas early microprocessor pipelines consisted of only a few stages, the attendant logic required to implement a result distribution bus was not much of an issue. But for every added stage in the execution pipeline, an additional set of result distribution logic must be provided. In other words, the logic required to implement a result distribution bus is directly proportional to the number of stages that required distribution of the result. Add to this the fact that more stages requires that logic elements to drive the result signals must be more powerful. Moreover, the timing to distribute results to multiple pipeline stages is not only a function of the number of stages, but is also a based upon the location of the stage that is physically farthest from the origination stage. Hence, circuit complexity, power, and timing problems arise when a result distribution scheme is applied to more advanced pipeline architectures that have more pipeline stages.

Therefore, what is needed is an apparatus in a pipeline microprocessor that allows dependent instructions to execute without delay, but which is not adversely affected by the number of stages in the microprocessor pipeline.

In addition, what is needed is a mechanism to provide dependent micro instructions with generated results that does not require additional sets of logic, or exhibit timing problems when employed in a pipeline microprocessor having multiple pipeline stages.

Furthermore, what is needed is an apparatus in a pipeline microprocessor for temporarily storing several intermediate results that can be accessed in a single pipeline stage by a dependent micro instruction.

SUMMARY OF THE INVENTION

To address the above-detailed deficiencies, it is an object of the present invention to provide a mechanism for expeditiously executing dependent instructions that can adapt, without adverse hardware, power consumption, or timing consequences, to advanced pipeline architectures having more pipeline stages.

Accordingly, in the attainment of the aforementioned object, it is a feature of the present invention to provide a microprocessor apparatus for providing intermediate results to a dependent micro instruction. The microprocessor apparatus includes a result forwarding cache, result update logic, and operand configuration logic. The result forwarding cache stores the intermediate results that have not been entered as results into a register file. The result update logic is coupled to the result forwarding cache and enters the intermediate results into the result forwarding cache, where the intermediate results are entered into the result forwarding cache prior to being entered as the results into the register file. The operand configuration logic is coupled to the result forwarding cache. The operand configuration logic accesses the intermediate results and provides an operand required by the dependent micro instruction, where the operand configuration logic provides the operand to the dependent micro instruction after the dependent micro instruction has accessed the register file.

An advantage of the present invention is that only minimal changes are required to provide results to dependent instructions when pipeline stages are added.

Another object of the present invention is to provide an apparatus for executing dependent instructions without delay that is less complex than has heretofore been provided.

In another aspect, it is a feature of the present invention to provide an intermediate result cache for storing intermediate results of previously executed micro instructions. The intermediate result cache has result buffers, a result selector, and operand configuration logic. The result buffers store the intermediate results, where the intermediate results are stored prior to being entered into a register file. The result selector is coupled to the result buffers. The result selector determines selected byte locations within selected result buffers that are used to configure an operand for a dependent micro instruction. The operand configuration logic is coupled to the result selector and the result buffers. The operand configuration logic retrieves bytes from the selected byte locations within the selected result buffers to configure the operand and the operand is provided to the dependent micro instruction subsequent to the dependent micro instruction accessing the register file.

Another advantage of the present invention is that a mechanism is provided that is suited for multi-stage pipeline designs.

A further object of the invention is to provide a mechanism for accessing results in a single pipeline stage whereby a dependent instruction can execute without incurring slips.

In a further aspect, it is a feature of the present invention to provide an apparatus in a pipeline microprocessor for providing an operand to a dependent micro instruction. The apparatus includes execution logic, result cache entries, result update logic, and operand configuration logic. The execution logic generates intermediate results of micro instructions that precede the dependent micro instruction. The result cache entries store the intermediate results. The result update logic is coupled to the execution logic and the result cache entries. The result update logic enters a specific intermediate result into a specific result cache entry following generation of the specific intermediate result by the execution logic and prior to the specific intermediate result being written to a specific destination register in a register file. The operand configuration logic is coupled to the result cache entries and selects bytes from selected result cache entries to configure the operand.

A further advantage of the present invention is that provision of results to dependent instructions can be accomplished in more advanced pipeline microprocessors without incurring problems related to circuit complexity, routing, power, or timing.

BRIEF DESCRIPTION OF THE DRAWINGS

These and other objects, features, and advantages of the present invention will become better understood with regard to the following description, and accompanying drawings where.

DETAILED DESCRIPTION

In light of the above background on techniques for executing micro instructions in a pipeline microprocessor, several related art examples will now be discussed with reference to FIGS. 1 through 5. These examples illustrate how present day techniques for distributing intermediate results to dependent micro instructions cause significant problems when applied to more recent pipeline architectures, particularly architectures that have several execution pipeline stages. Following this discussion, a detailed description of the present invention will be provided with reference to FIGS. 6 through 8. The present invention provides an apparatus that allows dependent micro instructions to access interim results. In contrast to conventional result distribution schemes, the present invention has characteristics-complexity, timing, power consumption, drive strength-that are essentially unaffected by the number of execution pipeline stages.

Figure 1:
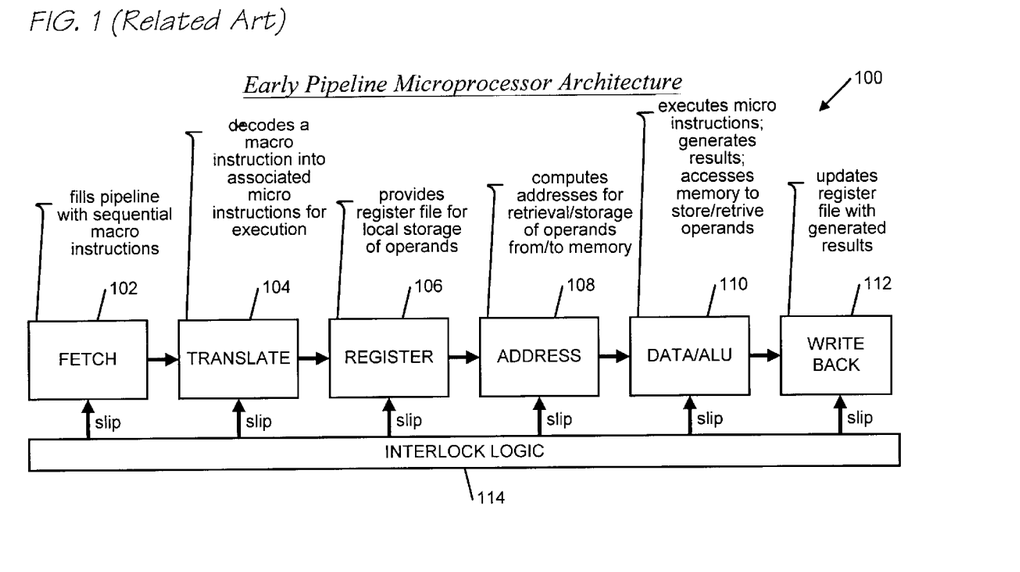
FIG. 1 is a block diagram illustrating stages of a related art pipeline microprocessor.

Referring to FIG. 1, a block diagram is presented illustrating stages of a related art pipeline microprocessor 100 that is exemplary of early microprocessor pipeline designs. The microprocessor 100 includes a fetch stage 102, translate stage 104, register stage 106, address stage 108, data/ALU stage 110, and write back stage 112. In addition, interlock logic 114 is shown coupled to all of the stages 102–112.

Operationally, the fetch stage 102 fetches instructions from memory (not shown) that are to be executed by the microprocessor 100. The translate stage 104 sequentially translates, or decodes, the fetched instructions into associated micro instructions, each micro instruction directing logic resources within subsequent stages of the microprocessor 100 to perform a specific subtask related to accomplishment of an operation prescribed by a fetched macro instruction. The register stage 106 retrieves operands specified by the micro instructions from a register file (not shown) for use by subsequent stages in the pipeline. The address stage 108 calculates memory addresses specified by the micro instructions to be used in data storage and retrieval operations. The data/ALU stage 110 either performs arithmetic logic unit (ALU) operations on data retrieved from the register file, or reads data from memory using the memory address calculated in the address stage 108, or writes data to memory using the memory address calculated in the address stage 108. The write back stage 112 updates registers in the register file with results generated or retrieved by the data/ALU stage 110. Together, the stages of the microprocessor 100 that execute micro instructions are together referred to a execution stages 106–112, or the execution pipe 106–112. Thus, macro instructions are fetched by the fetch stage 102, they are decoded into micro instructions by the translate stage 104, and the micro instructions proceed sequentially through the execution stages 106–112 of the microprocessor 100.

Micro instructions move through the execution stages 106–112 of the microprocessor pipeline in synchronization with a microprocessor clock. Optimally, while any given stage in the pipeline is executing a micro instruction, the previous stage should be executing the next micro instruction. If a stage in the pipeline requires more than one cycle of the pipeline clock to execute a given micro instruction, the interlock logic 114 temporarily stalls flow of micro instructions through the microprocessor pipeline: preceding stages in the pipeline are precluded from forwarding operands down the pipeline and succeeding stages, having completed execution of a current micro instruction, sit idle. A stall in the pipeline is referred to as a slip or a void. Slips cause delays when application programs execute on the microprocessor 100.

One case where the interlock logic 114 is required to insert slips into the pipeline arises when a second micro instruction immediately follows a first micro instruction in the execution order, and the second micro instruction in addition requires an operand from the register stage 106, where the operand is to be generated as a result of the first micro instruction when the first micro instruction executes in the data/ALU stage 110. Yet, when the second micro instruction enters the register stage 106 to fetch the operand from the register file, the first micro instruction is just entering the address stage 108, that is, the first micro instruction has not yet generated its result that is to be written back into the register file by the write back stage 112. For this reason, the second micro instruction is called a dependent micro instruction because one or more operands that it requires depend upon successful execution of a preceding micro instruction-in this case the first micro instruction-which has not yet written its result back into the register stage 106. Thus, when a dependent micro instruction is generated by the translate stage 104, the interlock logic 114 continues to insert slips into the execution pipe to stall execution of the dependent micro instruction until its required operands have been written back into the register file by a preceding micro instruction. Execution of a dependent micro instruction is more specifically discussed with reference to FIG. 2.

Figure 2:
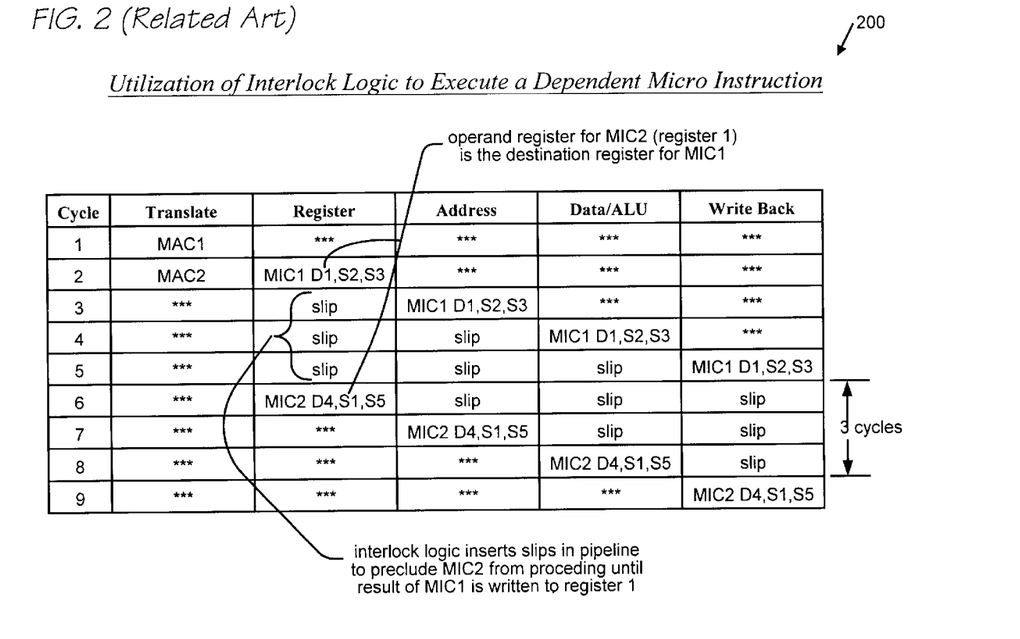
FIG. 2 is a table illustrating execution of a dependent micro instruction by the microprocessor of FIG. 1.

Referring to FIG. 2, a table 200 is presented illustrating execution of a dependent micro instruction by the microprocessor 100 of FIG. 1. Two macro instructions, a first macro instruction, designated MAC1, and a second macro instruction, designated MAC2, are shown in the Translate column of the table 200. The particular operations specified by the two macro instructions in FIG. 2 are not pertinent to this discussion, except to the extent that an operand that is required for execution of MAC2 is to be produced as a result of executing MAC1. Assume that the second macro instruction, MAC2, prescribes an operand that is to be generated as a result of the first macro instruction, MAC1. Different microprocessor instruction sets utilize different encoding techniques to prescribe operands, and for this reason, MAC1 and MAC2 two are shown to represent an operand dependency case within any instruction set. In addition, for clarity of discussion, a column corresponding to the fetch stage 102 is not shown. The marks * * * designate instructions before or after the instructions of interest. Progression of instructions through noted stages of the pipeline is shown with respect to cycles of a pipeline clock.

During cycle 1, the first macro instruction, MAC1, proceeds through the translate stage 102. Therein, the first macro instruction is decoded into a first micro instruction, designated as MIC1 D1,S2,S3. More specifically, an opcode field, MIC1, prescribes the operations that the execution stages 106–112 are to perform. The first micro instruction also prescribes a destination tag, D1, a first source tag, S2, and a second source tag, S3. The source tags, S2 and S3, specify that operands to be used by the first micro instruction reside in registers 2 and 3 of the register file. The destination tag, D1, specifies that a result of the first micro instruction, to be generated in the data/ALU stage 110, is to be written back by the write back stage 112 into register 1 in the register file.

During cycle 2, the first micro instruction proceeds through the register stage 106. Therein, the two source operands are retrieved from registers 2 and 3 in the register file. Also during cycle 2, the second macro instruction, MAC2, proceeds through the translate stage. Therein, it is translate into a second micro instruction, designated as MIC2 D4,S1,S5. Like the first micro instruction, the second micro instruction has an opcode field, MIC2, a destination tag D4, and two source tags, S1 and S5. Note at this point that the second micro instruction specifies a source operand from register 1 and that register 1 is also the destination of the result of the first micro instruction. Thus, the second micro instruction is a dependent micro instruction because its first source operand depends upon the result of the first micro instruction.

During cycle 3, the first micro instruction proceeds through the address stage 108. Therein, if required, logic within the address stage 108 generates an address to be used by the data/ALU stage 110. Optimally, it is desired that the second micro instruction proceed through the register stage 106 during cycle 3. But because the source operand that is required by the dependent micro instruction has not yet been written to register 1, the interlock logic 114 inserts a slip into the pipeline, thus stalling execution of the dependent micro instruction.

During cycle 4, the first micro instruction proceeds through the data/ALU stage 110. Therein, the prescribed operation is performed and the result is generated. Although the result is generated in this stage 110, it is not yet written back to register 1 in the register file. Therefore, the interlock logic 114 again inserts a slip into the pipeline to preclude the dependent micro instruction from proceeding.

During cycle 5, the first micro instruction proceeds through the write back stage 112. Therein, the result is written back into the destination register, register 1, in the register file. At this point, execution of the first micro instruction is completed. And because it is during this cycle that the write back occurs, the interlock logic 114 must again insert a slip into the pipeline to prevent the dependent micro instruction from prematurely proceeding into the register stage 106.

During cycle 6, because the operand required by the second micro instruction is now present in register 1, the second micro instruction is allowed to proceed through the register stage 106. Therein, the dependent operand is retrieved from register 1 and a second operand is retrieved from register 5.

A precise description of how the second micro instruction executes during cycles 7 through 9 is not germane to this discussion other than to note that three slips of the pipeline are required to prevent it from prematurely proceeding into the register stage 106.

Although stalling dependent micro instructions is a principal function of the interlock logic 114, microprocessor designers have observed that a significant number of dependencies exist in common application programs, primarily because application programs exhibit a sequential processing nature: they tend to perform operations to produce a first result and then perform a second operation on the first result to produce a second result, and so on. Consequently, to eliminate these delays in the execution of application programs, microprocessor designers have developed techniques that specifically expedite the execution of dependent micro instructions. One such technique, intermediate result distribution, is more specifically described with reference to FIG. 3.

Figure 3:
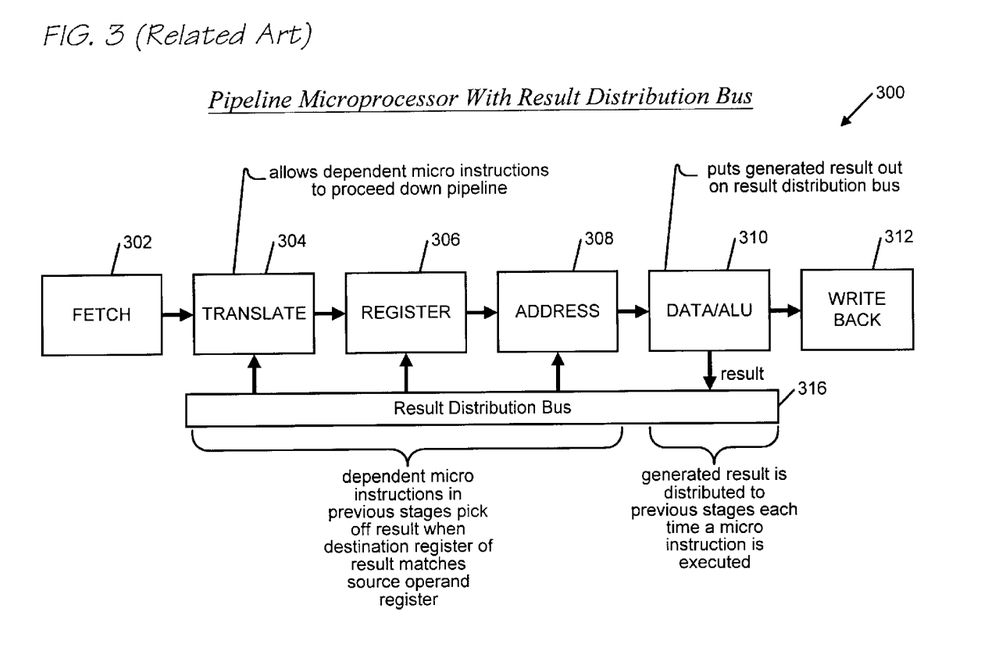
FIG. 3 is a block diagram illustrating stages of a related art pipeline microprocessor that employs a result distribution bus to preclude pipeline slips.

Referring to FIG. 3, a block diagram is presented illustrating stages of a related art pipeline microprocessor 300 that employs a result distribution bus 316 to preclude pipeline slips. The microprocessor 300 includes a fetch stage 302, translate stage 304, register stage 306, address stage 308, data/ALU stage 310, and write back stage 312. In addition, a result distribution bus 316 is shown coupled to stages 304 through 310.

In operation, the pipeline stages 302–312 of the microprocessor 300 in FIG. 3 function like corresponding stages 102–112 of the microprocessor 100 discussed with reference to FIG. 1, the hundreds digit being replaced with a 3. However, the microprocessor 300 shown in FIG. 3 has been provided with a result distribution bus 316 to expedite the execution of dependent micro instructions. As noted above, results are generated in the data/ALU stage 310, but are not written back into a register file (not shown) in the register stage 306 until a micro instruction proceeds through the write back stage 312. The purpose of the result distribution bus 316 is to provide a means that allows a dependent micro instruction to proceed through the execution pipe 306–312 without inserting slips. The dependent micro instruction is designated as such and is permitted to proceed ahead. Because it is a dependent micro instruction that has been allowed to proceed, when it advances through the register stage 306, one or more of its required operands are not going to be present in the register file. This is by definition. Yet, at some point a preceding micro instruction will generate a result that corresponds to the required one or more operands. And because the result is not yet written back to the register file, it is referred to as an intermediate result. Thus, when the intermediate result is generated by the preceding micro instruction, it is placed out on the result distribution bus 316 along with a destination tag designating its destination register in the register file. Logic within each of the stages 304–308 to which the intermediate result is distributed compares the destination tag on the bus 316 to the source register tags for corresponding micro instructions within each stage. If the destination tag does not match either of the source register tags for a given micro instruction, then the given micro instruction is not dependent; it proceeds to the next stage of the pipeline with its two source operands intact. If, on the other hand, the destination tag matches either or both of the source tags for a given micro instruction, then the given micro instruction is dependent; the intermediate result is then provided to the dependent micro instruction via the result distribution bus 316.

When employing a result distribution scheme, it is significant to note that when a preceding micro instruction generates an intermediate result and places it out on the result distribution bus, a corresponding dependent micro instruction may be either in the translate stage 304, the register stage 306, or the address stage 308. Consequently, logic (not shown) is provided within each of the stages 304–308 to match register tags and substitute intermediate results. Furthermore, because typical micro instructions can have two source operands, a case may occur where a dependent micro instruction has a first operand that depends on a first preceding micro instruction and a second operand that depends on a second preceding micro instruction. Hence, the first and second operands are provided when the dependent micro instruction is in different stages 304–308. Furthermore, a given intermediate result may be required by more than one dependent micro instruction. In this case, when the intermediate result is generated, it must be distributed to more than a single pipeline stage.

The span of the result distribution bus 316 in FIG. 3 is geared toward an implementation that substitutes intermediate results for operands in a pipeline stage 304–308 immediately prior to entering a following stage. One skilled in the art will appreciate that if a particular implementation substitutes intermediate results when a dependent micro instruction immediately enters a pipeline stage, then the result distribution bus must span stages 306–312 rather than stages 304–310. Utilization of the result distribution technique to expedite execution of two dependent micro instructions is particularly discussed with reference to FIG. 4.

Figure 4:
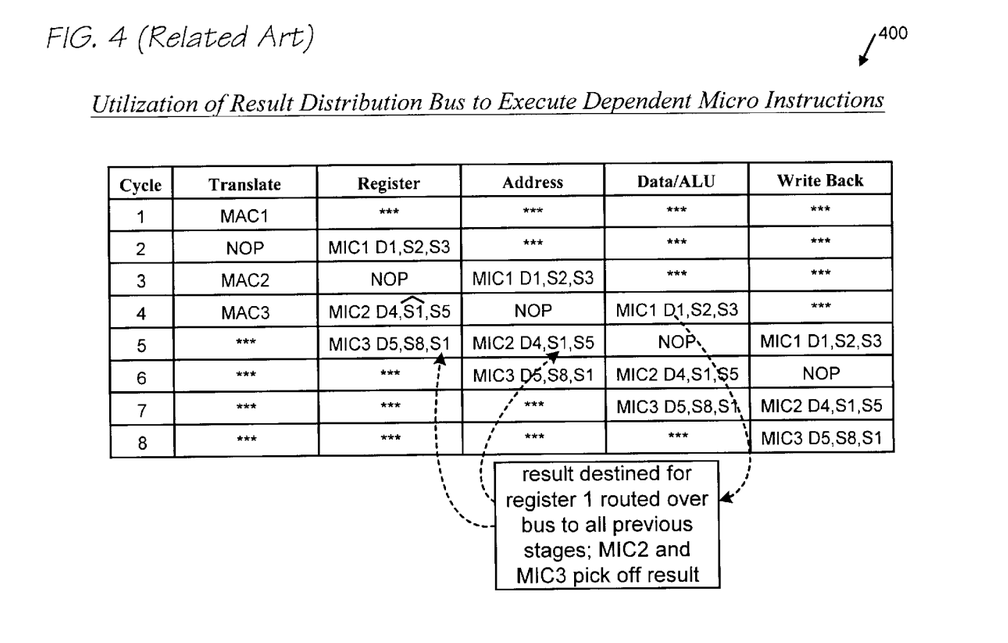
FIG. 4 is a table illustrating execution of two dependent micro instructions by the microprocessor of FIG. 3.

Referring to FIG. 4, a table 400 is presented illustrating execution of two dependent micro instructions by the microprocessor of FIG. 3. Four macro instructions, a first macro instruction, designated MAC1, a second macro instruction, designated NOP, a third macro instruction, designated MAC2, and a fourth macro instruction, designated MAC3, are shown in the Translate column of the table 400. The particular operations specified by the first, third, and fourth macro instructions in FIG. 4 are not pertinent to this discussion, except to the extent that both MAC2 and MAC3 require an operand from register S1 that is to be produced as a result of executing MAC1. Therefore, like the macro instructions described with reference to FIG. 2, MAC1, MAC2, and MAC3 are shown to represent an operand dependency case within any microprocessor instruction set. The second macro instruction, NOP, prescribes a non-operation, similar in function to an intentionally programmed slip in the pipeline. It has been inserted between MAC1 and MAC2 in the sequence to highlight the fact that a dependent micro instruction need not necessarily immediately follow a micro instruction that is to produce a result needed by the dependent micro instruction. For clarity of discussion, a column corresponding to the fetch stage 302 is not shown. The marks * * * designate instructions before or after the instructions of interest. Progression of instructions through noted stages of the pipeline is shown with respect to cycles of a pipeline clock.

During cycle 1, the first macro instruction, MAC1, proceeds through the translate stage 302. Therein, the first macro instruction is decoded into a first micro instruction, designated as MIC1 D1,S2,S3. More specifically, an opcode field, MIC1, prescribes the operations that the execution stages 306–312 are to perform. The first micro instruction also prescribes a destination tag, D1, a first source tag, S2, and a second source tag, S3. The source tags, S2 and S3, specify that operands to be used by the first micro instruction reside in registers 2 and 3 of the register file. The destination tag, D1, specifies that a result of the first micro instruction, to be generated in the data/ALU stage 310, is to be written back by the write back stage 312 into register 1 in the register file.

During cycle 2, the first micro instruction proceeds through the register stage 306. Therein, the two source operands are retrieved from registers 2 and 3 in the register file. Also during cycle 2, the second macro instruction, NOP, proceeds through the translate stage. Therein, it is translated into a NOP micro instruction, designated as NOP.

During cycle 3, the first micro instruction proceeds through the address stage 308. Therein, if required, logic within the address stage 308 generates an address to be used by the data/ALU stage 310. Also during cycle 3, the second micro instruction, NOP, proceeds through the register stage 306. In addition during cycle 3, the third macro instruction, MAC2, proceeds through the translate stage 304. Therein, it is translated into a third micro instruction, designated as MIC2 D4,S1,S5. Like the first micro instruction, the third micro instruction has an opcode field, MIC2, a destination tag D4, and two source tags, S1 and S5. Note at this point that the third micro instruction specifies a source operand from register 1 and that register 1 is also the destination of the result of the first micro instruction. Thus, the third micro instruction is a dependent micro instruction because its first source operand depends upon the result of the first micro instruction. For this reason a hat ("^") is depicted over the dependant operand specifier, S1.

During cycle 4, the first micro instruction proceeds through the data/ALU stage 310. Therein, the prescribed operation is performed and the intermediate result is generated. Although the intermediate result is generated in this stage 310, it is not yet written back to register 1 in the register file. However, because the microprocessor 300 in FIG. 3 employs a result distribution bus 316, the data/ALU stage 310 places the intermediate result out on the result distribution bus 316 so that any dependent micro instructions can retrieve it. Also during cycle 4, the second micro instruction, NOP, proceeds through the address stage 308. In addition, during cycle 4, the third micro instruction is allowed to proceed through the register stage 306. Therein, it retrieves source operands from registers 1 and 5, however, the contents of register 1 are not valid for execution. Yet, at the end of cycle 4, logic in the register stage 306 matches the operand tag for the third micro instruction with the destination tag for the first micro instruction and thus retrieves the intermediate result destined for register 1 from the result distribution bus and provides it to the third micro instruction. Hence, the third micro instruction will proceed into the address stage 308 during cycle 5 having a valid operand. Furthermore, during cycle 4, the fourth macro instruction proceeds through the translate stage 304. Therein it is decoded into a fourth micro instruction, MIC3 D5,S8,S1. At the end of cycle 4, MIC3 also picks the intermediate result off of the result distribution bus 316 so that it will proceed into the next stage having the proper operand.

The four micro instructions continue to execute through completion during cycles 5 through 8. A precise description of each of the remaining cycles is not relevant to this discussion other than to note that 1) pipeline slips are not required to be inserted for dependent micro instructions when utilizing a result distribution bus 316, and 2) distribution of the intermediate result to both dependent micro instructions, MIC2 and MIC3, occurred at the end of cycle 4, the cycle in which the intermediate result was generated. Consequently, the result distribution technique requires that tag comparison and substitution logic be present within any pipeline stage wherein a dependent micro instruction is to be provided with an intermediate result. Slips are avoided, albeit at the expense of additional logic.

Figure 5:
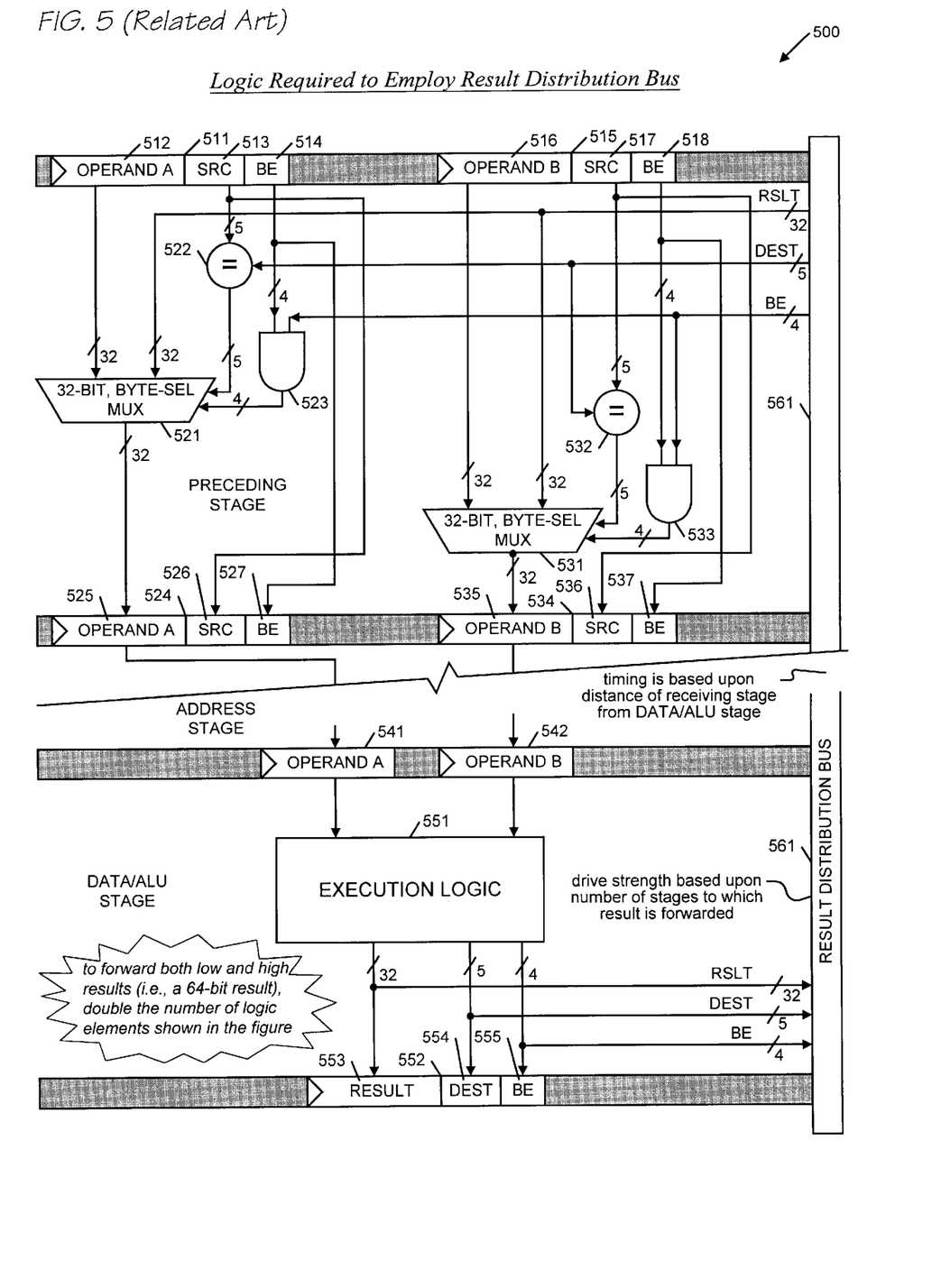
FIG. 5 is a block diagram illustrating result distribution bus logic in a preceding stage of the microprocessor of FIG. 3.

Now referring to FIG. 5, a block diagram 500 is presented illustrating result distribution bus logic in a preceding stage of the microprocessor of FIG. 3. For the microprocessor 300 shown in FIG. 3, the preceding stage can be either the translate state 304, the register stage 306, or the address stage 308 to which results are distributed. For any other microprocessor that employs a result distribution scheme, the preceding stage corresponds to any stage to which intermediate results are distributed. The preceding stage includes two tag comparison logic elements 522, 532 that are each connected to two 32-bit byte-selectable muxes 521, 531. In addition, two byte selectors 523, 533 are connected to the muxes 521, 531. Two sets of comparison elements 522, 532, muxes 521, 531, and byte selectors 523, 533 are shown in the preceding stage because typical micro instructions, particularly those for an x86-compatible microprocessor, have two source operands, either of which can be dependent upon generation of an intermediate result. The block diagram 300 also includes execution logic 551 in the data/ALU stage for generating an intermediate result. The intermediate result is routed to both result register 552 and a result distribution bus 561. The result distribution bus 561 provides the intermediate result to the preceding stage.

micro instruction are piped to successive stages of the microprocessor via operand registers 511, 515, 524, 534, 541, 542. When a result distribution scheme is employed, each of the operand registers 511, 515, 524, 534 up to the address stage, in addition to providing operand fields, 512, 516, 525, 535, must also carry along source tag fields 513, 517, 526, 536 so that their source tags can be compared to an intermediate result's destination tag. In addition, each operand register 511, 515, 524, 534 also has a byte-enable field 514, 518, 527, 537 to indicate which bytes from a multi-byte operand register are required for associated operands. For example, macro instructions for a 32-bit x86-compatible microprocessor can specify several different operand sizes to include, 8-bit, 16-bit, and 32-bit operands. Assuming that 32-bit registers in a register file are provided in the microprocessor to accommodate up to 32-bit operands, then when a micro instruction only specifies an 8-bit operand, it must retrieve only the lower byte of the corresponding 32-bit register in the register file. Because of this, operand size must be indicated for both dependent operands and intermediate results so the proper bytes of an intermediate result are distributed and substituted in the preceding stage. The ensuing discussion is directed to result distribution in a 32-bit x86-compatible microprocessor as described above, however, one skilled in the art will appreciate that the discussion can be applied more to present day microprocessors other than 32-bit x86-compatible microprocessors.

The execution logic 551 retrieves two operands from registers 541 and 542 and performs the operation that is prescribed by an associated micro instruction, thus generating an intermediate result. The intermediate result is provided to the result register 552 and additionally to the result distribution bus 561. The result register 552 has a result field 553 that contains the intermediate result. The result register 552 also has a destination tag field 554 that designates the destination register in the register file (not shown) for the intermediate result. The result register 552 additionally has a byte-enable field 555 that indicates which bytes of the intermediate result are valid, that is, whether the intermediate result is 8-bit, 16-bit, or 32-bit in size.

The intermediate result, the destination tag, and the associated byte-enable indicator are routed to the preceding stage over the result distribution bus 561. Within the preceding stage, the intermediate result is provided to both muxes 521, 531. The destination tag is routed to both tag comparison logic elements 522, 532. The byte-enable indicator is routed to both byte selectors 523, 533. When the destination tag matches either of the source tags from fields 523, 517, then the corresponding mux 521, 531 is enabled to substitute the intermediate result for contents of the corresponding operand field 512, 516. In addition, the corresponding byte selector 523, 533 enables substitution only for bytes required for the dependent operand. For example, suppose the intermediate result is a 32-bit data element that is destined for register 1 in the register file. Further suppose that a dependent micro instruction in the preceding stage prescribes operand B as being from source register 1, and that operand B is an 8-bit operand. Hence, tag comparison element 532 will indicate a tag match, thus enabling the 32-bit mux 531 for operand B. The byte-selector 533 for operand B, however, will only allow substitution of the lower 8-bits of the intermediate result, because operand B is an 8-bit operand. Alternatively, suppose the intermediate result is a 16-bit data element that is destined for register 2 in the register file. Further suppose that a dependent micro instruction in the preceding stage prescribes operand A as being from source register 2, and that operand A is a 32-bit operand. Hence, tag comparison element 522 will indicate a tag match, thus enabling the 32-bit mux 521 for operand A. The byte-selector 523 for operand A, however, will only allow substitution of the lower 16-bits of the intermediate result, because, although operand A is a 32-bit operand, only the lower 16 bits are provided by the intermediate result.

One skilled in the art will appreciate that the 32-bit x86-compatible example of result distribution shown in FIG. 5 does not necessarily have to employ the specific types of logic elements 521, 522, 523, 531, 532, 533 shown in the figure, however, to implement result distribution, logic that is equivalent in function to those elements must be used. One set of elements is required for each source operand. Furthermore, although not specifically depicted in FIG. 5, many microprocessors, including x86-compatible microprocessors, provide a number of micro instructions that generate more than one intermediate result. For example, a multiply micro instruction will multiply a 32-bit operand by another 32-bit operand to form a 64-bit result. The 64-bit result is typically stored in two distinct destination registers-a low result register and a high result register. Thus, to distribute both a low and high result would require even more logic that that shown to arbitrate between essentially two intermediate results and their associated destination tags and byte-enable indicators.

Three points need be noted about result distribution techniques. First, the logic required to distribute intermediate results must be present within all preceding stages. Second, the time to setup and distribute an intermediate result to the preceding stages is driven by the preceding stage that is farthest in distance away from the data/ALU stage on the physical microprocessor integrated circuit. Third, the drive strength required of logic elements to distribute the intermediate results is based upon the number of stages to which the intermediate results are provided.

The result distribution technique has sufficed for a few generations of pipeline microprocessors, primarily because the number of logic devices required and the associated timing and drive strength requirements were tolerable. However, two factors associated with newer generations of pipeline microprocessors are now forcing microprocessor designers to rethink result distribution as a means for expediting the execution of dependent micro instructions. First, advances in integrated circuit design and fabrication techniques are allowing microprocessor designs to be scaled to the sub-micron level. Scaled designs run faster and use less power, simply because the logic elements are smaller and the signal paths are shorter. But scaling tends to precipitate timing- and power-related problems in a scaled design that would not otherwise be evident. Second, to increase throughput, newer microprocessor designs exhibit more pipeline stages that perform fewer functions within each stage. Because fewer functions are performed in each stage, less time is required to perform the functions in each stage, thereby allowing additional increases in clock speeds. But decreasing the functions in one stage, say cutting functional requirements in half, requires an additional stage to perform the other half of the required functions. So, whereas the last generation of pipeline microprocessors consisted of, say, six pipeline stages operating at 200 MHz, the next generation of pipeline microprocessors consists of, say, 12 stages that operate at 500 MHz. The speed increase is due both to pipeline stage architectural changes and to scaling effects. This trend is expected to continue in the art.

Recall the three points noted above about result distribution: 1) the number of logic elements required to implement result distribution is proportional to the number of preceding stages to which intermediate results are distributed; 2) the timing considerations for distributing intermediate results are a function of distance from the stage that generates the intermediate result; and 3) the power required of drivers to distribute intermediate results is also proportional to the number of preceding stages. Consequently, the examples discussed with reference to FIGS. 1 through 5 show that increasing the number of stages in a microprocessor design reveals the deficiencies inherent in the result distribution technique. To implement result distribution in a microprocessor with more stages requires an inordinately complex configuration of logic devices having associated routing complexities, timing concerns, and power issues. In essence, result distribution is a technique that is not suited for more advanced pipeline architectures.

The present invention overcomes the limitations of result distribution by providing a means whereby several intermediate results are retained, thereby allowing a dependent micro instruction to access the intermediate results only one time, in a pipeline stage immediately preceding the stage in which operands are needed. The design of a microprocessor according to the present invention is much less complex, it requires less power, and it does not present timing problems. The present invention is now discussed with reference to FIGS. 6 through 8.

Figure 6:
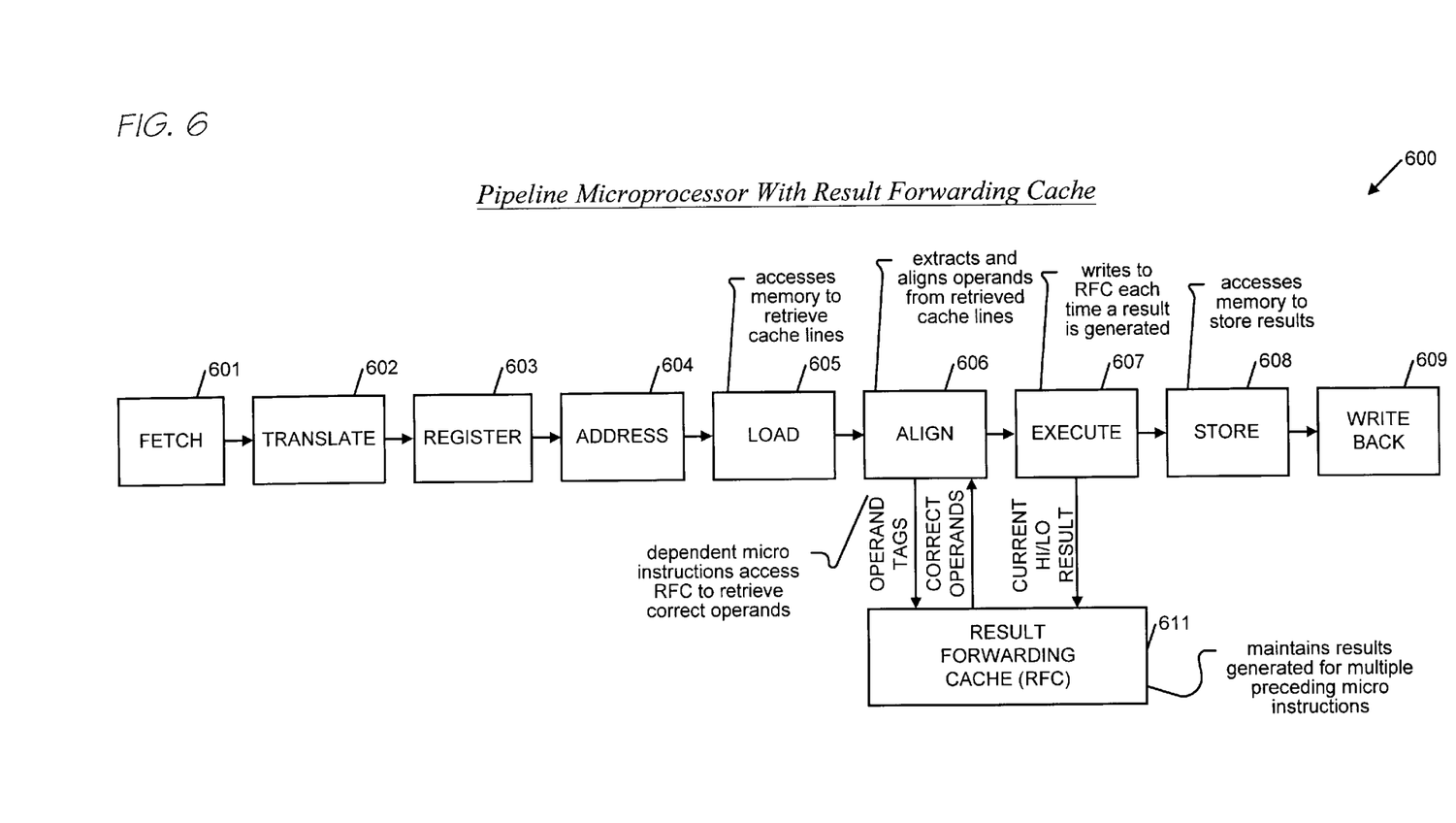
FIG. 6 is a block diagram of a microprocessor according to the present invention featuring a result forwarding cache.

Now referring to FIG. 6, a block diagram is presented of a microprocessor 600 according to the present invention featuring a result forwarding cache 611. The microprocessor 600 includes a fetch stage 601, translate stage 602, register stage 603, address stage 604, load stage 605, align stage 606, execute stage 607, store stage 608, and write back stage 609. In addition, the microprocessor 600 includes a result forwarding cache 611 that is coupled to the align stage 606 and the execute stage 607. As was alluded to earlier, the microprocessor 600 according to the present invention exhibits more pipeline stages 601–609 than earlier designs. More specifically, the microprocessor 600 has seven stages 603–609 in its execute pipe as compared to four stages shown for the microprocessors 100, 300 of FIGS. 1 and 3. The stages 601–609 in the microprocessor each perform fewer functions, thus providing for faster clock speeds.

In operation, the fetch stage 601 fetches instructions from memory (not shown) that are to be executed by the microprocessor 600. The translate stage 602 sequentially translates the fetched instructions into associated micro instructions. The register stage 603 retrieves operands specified by the micro instructions from a register file (not shown) for use by subsequent stages in the pipeline. The address stage 604 calculates memory addresses specified by the micro instructions to be used in data storage and retrieval operations. The load stage 605 reads cache lines from memory to load operands using the address generated in the address stage 604. The align stage 606 extracts the operands from the retrieved cache lines and aligns the operands for execution. In addition, dependent micro instructions proceeding through the align stage 616 access intermediate results in the result forward cache 611 to retrieve dependent operands. The execute stage 607 performs ALU operations on the operands to generate the intermediate results. The intermediate results are provided to the result forward cache 611 along with associated destination and byte-enable tags. The store stage 608 writes either intermediate results or operands to memory using the address calculated in the address stage 604. The write back stage 609 updates registers in the register file with the intermediate results generated in the execute stage 607 or with operands retrieved from memory by the load stage 605.

The result forwarding cache 611 is an array of storage elements that stores multiple intermediate results and associated tag information for a corresponding number of preceding micro instructions, that is, the number of intermediate results required to configure and provide an operand to a dependent micro instruction. Since more than one intermediate result may be destined for a given register in the register file, the result forwarding cache also maintains information for each intermediate result indicating its relative priority for substitution purposes. In one embodiment, the result forwarding cache 611 contains five storage elements corresponding to five preceding intermediate results. Thus, when a micro instruction proceeds through the align stage 606, its operand source register tags are provided to the result forwarding cache 611. The result forwarding cache 611, in turn, configures one or both operands from the most recently generated bytes of intermediate results therein whose destination register tags match the provided source register tags. In addition, the result forwarding cache 611 provides operand bytes in accordance with the operand size (i.e, 8-bit, 16-bit, 32-bit) that is specified by the micro instruction.

In a microprocessor 600 according to the present invention, a dependent micro instruction updates its operands in the stage 606 immediately preceding the execute stage 607. Therefore, timing, routing, and drive strength issues are eliminated because intermediate results are only provided to a single-pipeline stage 606 that is physically close to the execute stage 607 on the integrated circuit. The growth versus complexity issue is addressed by the present invention, because increasing the number of stages in a microprocessor 600 according to the present invention would only require that the number of storage elements in the result forwarding cache 611 be increased. The addition of more complex logic elements to new stages of the microprocessor 600 is not required.

Figure 7:
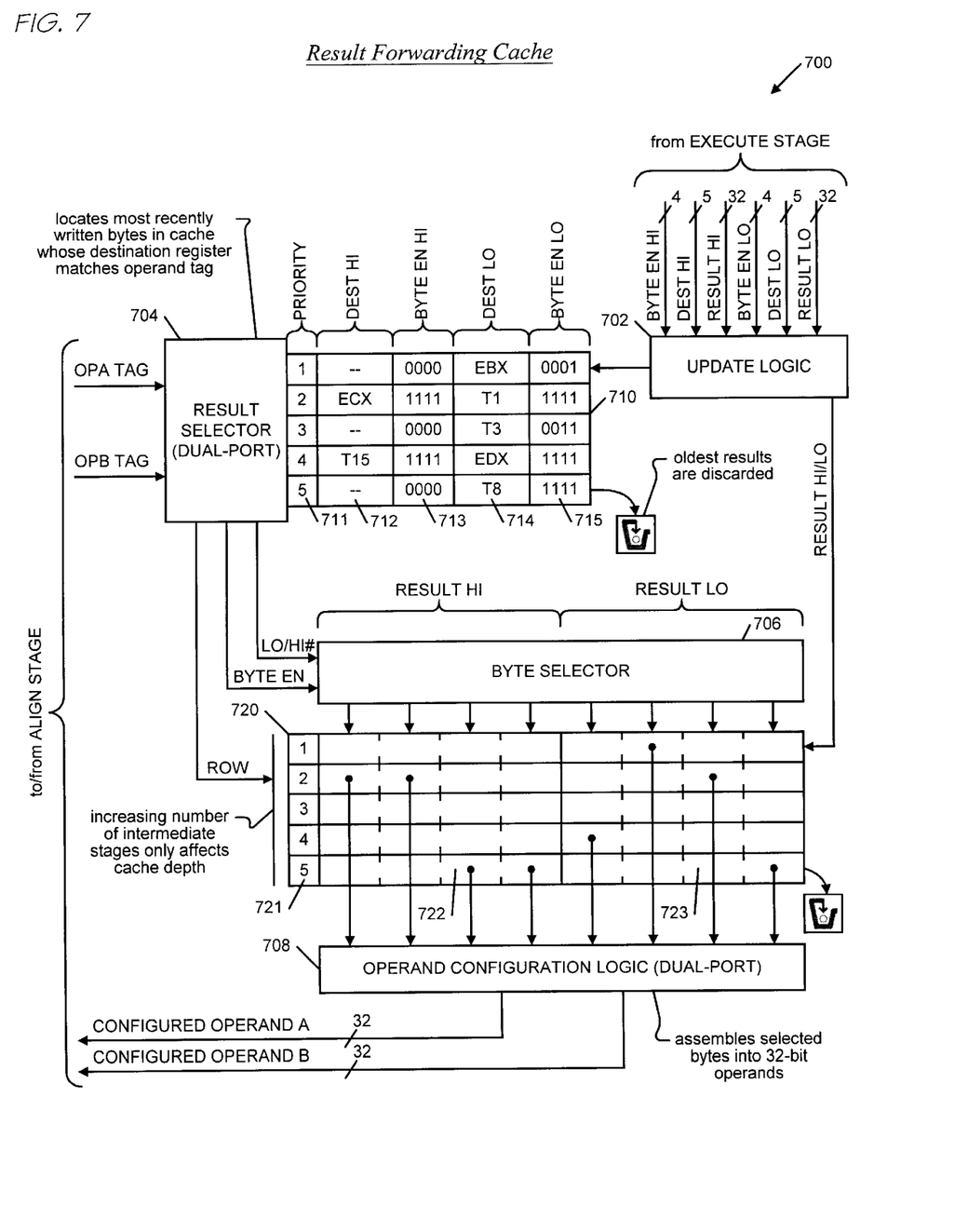
FIG. 7 is a block diagram illustrating details of a result forwarding cache according to the present invention

Now referring to FIG. 7, a block diagram is presented illustrating details of a result forwarding cache 700 according to the present invention. In one embodiment, the result forward cache 700 has a result selector 704 that receives operand tags from a micro instruction in the align stage of a microprocessor according to the present invention. The operand tags each comprise data designating a corresponding operand source register in a register file along with data prescribing the operand size (8-bit, 16-bit, 32-bit, etc.). The result selector 704 is coupled to a tag array 710. Lines in the tag array each have an intermediate result priority field 711, a high-order intermediate result destination register field 712, a high-order byte enable field 713, a low-order intermediate result destination register field 714, and a low-order byte enable field 715. The tag array 710 receives its entries from result update logic 702. The result update logic 702 is coupled to execute stage logic in a microprocessor according to the present invention.

The result update logic 702 provides intermediate results to an intermediate result array 720 having entries that correspond to entries in the tag array 710. Each entry in the intermediate result array 720 has a priority field 721, a high-order intermediate result field 722, and a low-order intermediate result field 723. Low-order 714, 715, 723 and high-order 712, 713, 722 fields are provided in the tag array 710 and intermediate result array 720 to accommodate microprocessor instruction sets having micro instructions that produce two 32-bit results, such as that directed by a multiply instruction in an x86-compatible microprocessor.

The intermediate result array 720 is indexed by the result selector 704 and a byte selector 706. Outputs from the intermediate result array 720 are provided to operand configuration logic 708. The operand configuration logic 708 simultaneously provides up to two configured operands back to the micro instruction in the align stage.

Operationally, each time the execute stage logic executes a micro instruction that produces an intermediate result, the intermediate result, RESULT HI, RESULT LO, is provided to the result update logic 702 along with corresponding destination register tags, DEST HI, DEST LO and size specifiers, BYTE EN HI, BYTE EN LO. RESULT HI and RESULT LO are written to a most recently generated entry in the intermediate result array 720, in this embodiment, the entry having priority field 711 equal to 1. In parallel, the tag and size specifiers are written to the corresponding most recently generated entry in the tag array 710 (priority 1). When a new intermediate result is entered into the result forwarding cache 700, contents of the tag array 710 and intermediate result array 720 are manipulated such that a least recently generated intermediate result and corresponding tag and size specifiers are cast out or the arrays 710, 720. One skilled in the art will appreciate that manipulating the array contents is just one embodiment available for indicating priority. In an alternative embodiment, the least recently generated result data is simply overwritten by the most recently generated interim result data and the priority fields 711, 721 are modified. Thus, the five most recently generated intermediate results are maintained in the embodiment of the result forward cache 700 presented in FIG. 7. For example, contents of the tag array 710 indicate that the most recently generated intermediate result (i.e., priority 1) comprises an 8-bit low-order intermediate result that having register EBX as a destination register in the register file. The intermediate result corresponding to priority 2 (i.e., the intermediate result generated immediately prior to the priority 1 intermediate result) comprises both a 32-bit low-order and a 32-bit high-order intermediate result. The high-order intermediate result designates register ECX as its destination and the low-order result designates register T1. The priority 3 intermediate result is a 16-bit low-order result destined for register T3.

In one embodiment, when a micro instruction proceeds through the align stage, both of its operand tags, OPA TAG and OPB TAG, are provided to the dual-port result selector 704. The result selector 704 evaluates tag array entries to select the most recently written intermediate result bytes that have destinations matching the operands source register tags. In addition, bytes are selected based upon the size of the specified operands and that of the intermediate results. Source and destination tag matches can occur for either a low-order intermediate result or a high-order result, thus a LO/HI# control signal is provided to the byte selector along with a byte enable signal. In one embodiment, the result selector 704 enables bytes in the intermediate result array 720 for configuration of the operands by providing row and column information via the LO/HI#, BYTE EN, and ROW signals.

The enabled bytes in the intermediate result array 720 are passed to the operand configuration logic 708. The operand configuration logic 708 assembles the enabled bytes into the two operands and provides the operands to the dependent micro instruction in the align stage. One skilled in the art will appreciate that increasing the number of stages in a microprocessor according to the present invention requires only additional entries in the tag array 710 and intermediate result array 720. Neither timing nor power requirements for the result forwarding cache would be notably affected.

Figure 8:
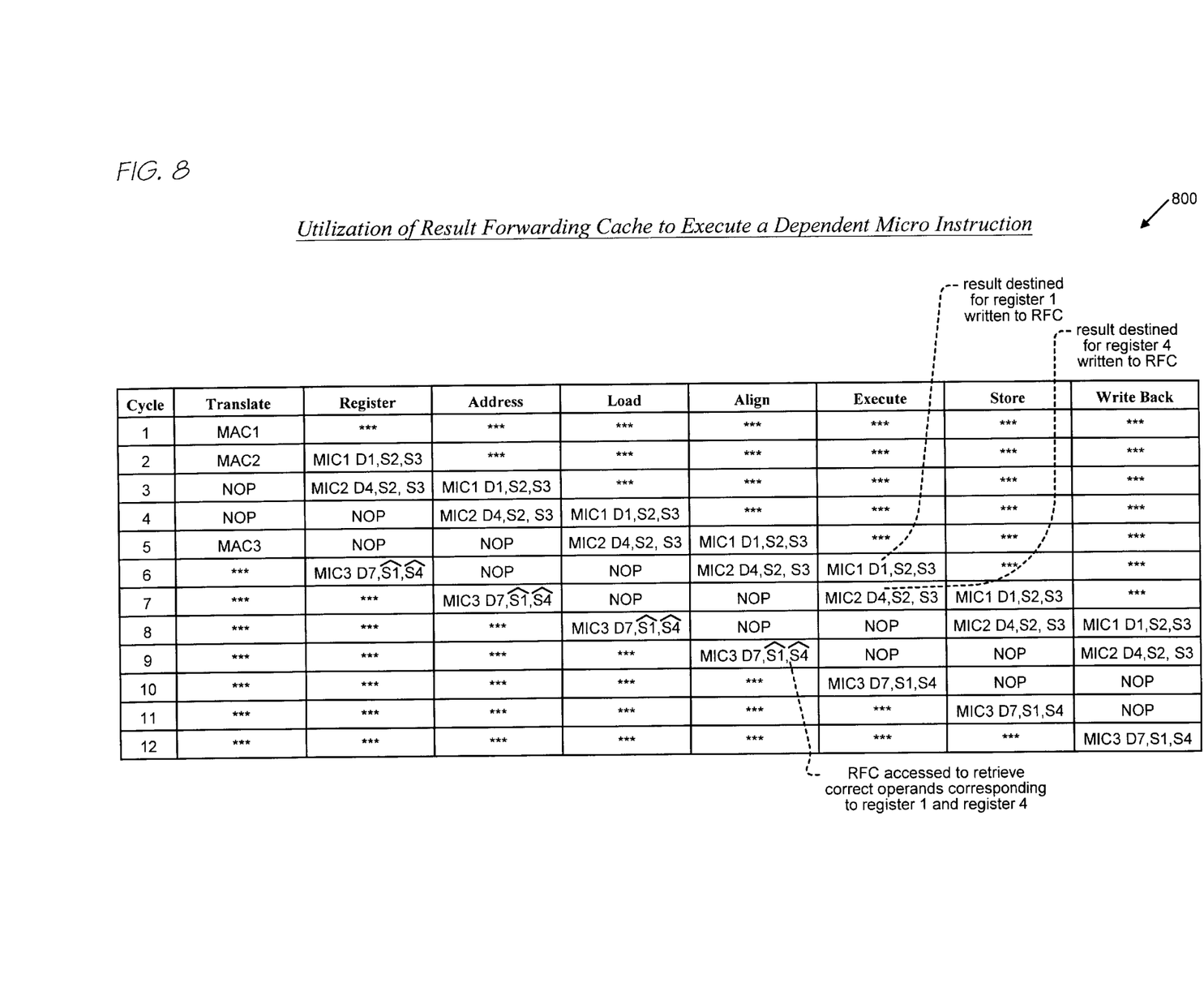
FIG. 8 is a table illustrating execution of a dependent micro instruction having two dependent operands by the microprocessor of FIG. 6.

Now referring to FIG. 8, table 800 is presented illustrating execution of a dependent micro instruction having two dependent operands by the microprocessor of FIG. 6. Five macro instructions, a first macro instruction, designated MAC1, a second macro instruction, designated MAC2, a third macro instruction, designated NOP, a fourth macro instruction, designated NOP, and a fifth macro instruction, designated MAC3, are shown in the Translate column of the table 400. The particular operations specified by the first, second, and fifth macro instructions are not pertinent to this discussion, except to the extent that both MAC3 requires an operand from register S1 that is to be produced as a result of executing MAC1 and another operand from register S4 that is to be produced as a result of executing MAC2. Thus, similar to the macro instructions described with reference to FIGS. 2 and 4, MAC1, MAC2, and MAC3 are shown to represent an operand dependency case within any microprocessor instruction set. The second and third macro instructions are NOP instructions. For clarity of discussion, a column corresponding to the fetch stage 601 is not shown. The marks * * * designate instructions before or after the instructions of interest. Progression of instructions through noted stages of the pipeline is shown with respect to cycles of a pipeline clock.

During cycle 1, the first macro instruction, MAC1, proceeds through the translate stage 602. Therein, the first macro instruction is decoded into a first micro instruction, designated as MIC1 D1,S2,S3. The first micro instruction also prescribes a destination tag, D1, a first source tag, S2, and a second source tag, S3.

During cycle 2, the first micro instruction proceeds through the register stage 603. Therein, the two source operands are retrieved from registers 2 and 3 in the register file. Also during cycle 2, the second macro instruction, MAC2 proceed through the translate stage 602. Therein it is translated into an associated second micro instruction, designated as MIC2 D4,S2,S3. The second micro instruction prescribes a destination tag, D4, a first source tag, S2, and a second source tag, S3.

During cycle 3, the first micro instruction proceeds through the address stage 604. Therein, if required, logic within the address stage 604 generates an address to be used by the subsequent stages. Also during cycle 3, the second micro instruction, MIC2, proceeds through the register stage 603. Therein, it retrieves operands from registers 2 and 3. In addition during cycle 3, the third macro instruction, NOP, proceeds through the translate stage 602 wherein it is decoded into a third micro instruction, designated as NOP.

During cycle 4, MIC1 proceeds through the load stage 605. Also during cycle 4, MIC2 proceeds through the address stage 604. In addition during cycle 4, the third micro instruction, NOP, proceeds through the register stage 603. Furthermore during cycle 4, the fourth macro instruction proceeds through the translate stage 602 and is decoded into a corresponding NOP micro instruction.

During cycle 5, the first four micro instructions proceed into their next corresponding stage and the fifth macro instruction, MAC3, proceeds through the translate stage 602 wherein it is decoded into a fifth micro instruction, designated as MIC3 D7,S1,S4. Note that its first source operand, S1, corresponds to the destination operand, D1, of the first micro instruction, MIC1, and its second source operand, S4, corresponds to the destination operand, D4, of the second micro instruction, MIC2. Thus, MIC3 is dependent upon both MIC1 and MIC2.

During cycle 6, MIC1 proceeds through the execute stage 607 wherein it generates an intermediate result destined for register 1. The intermediate result is entered into the most recently generated intermediate result entry in the result forwarding cache 611. Also during cycle 6, the remaining four micro instructions proceed to their next corresponding stage.

During cycle 7, the five micro instructions proceed to their next corresponding stage. The significant event during this cycle is that MIC2 copies its intermediate result to the most recently generated entry in the result forwarding cache 611. The intermediate result provided by MIC1 is shifted to a lower priority.

During cycle 8, the five micro instructions proceed to their next corresponding stage without events that are relevant to this discussion.

During cycle 9, the five micro instructions proceed to their next corresponding stage. Of significance is that MIC3 proceeds through the align stage 606 and therein provides its two source register tags, S1 and S4, to the result forward cache 611. The result forward cache 611 finds destination tag matches for both operands and thus configures the two operands from bytes of the two intermediate results. The two operands are provided to MIC3.

The micro instructions continue to execute through completion during cycles 10 through 12. A precise description of each of the remaining cycles is not relevant to this discussion other than to note that both intermediate results were accessed to produce the two required operands for MIC3 during cycle 9, while MIC was in the align stage 606.

The present invention provides a means for expediting the execution of a dependent micro instruction that supports more advance pipeline designs, specifically those that exhibit more pipeline stages. In addition, the result forwarding cache allows dependent micro instructions to access all needed intermediate results in a single stage, thereby eliminating the requirements for complex result distribution logic in multiple pipeline stages.

PIE: more than two operands, multiple results, dougble pipelines, etc.

Although the present invention and its objects, features, and advantages have been described in detail, other embodiments are encompassed by the invention. For example, the present invention has been particularly characterized in terms of a microprocessor pipeline comprising seven stages in an execute pipe. Although a seven-stage execute pipe is representative of most present day architectures, the present invention is not restricted by this configuration. As alluded to above, more or less stages in the execute pipe simply drives the number of intermediate result and tag entries that are required to be in the result forward cache.

In addition, the present invention has been characterized in terms of x86-compatible instructions for execution on an x86-compatible microprocessor. Instructions for an x86-compatible microprocessor provide for two source operands and one destination operand. It is noted, however, that the present invention comprehends any microprocessor, array processor, micro controller, signal processor, or similar device that processes instructions in a pipeline manner. The present invention can be easily adapted to accommodate more than two source operands and more than a single destination operand.

Moreover, the present invention comprehends microprocessor architectures that are different than the 32-bit embodiment described herein. A 64-bit, or even a 128-bit result forward cache is comprehended by an embodiment having a modified operand size indicator and intermediate result array.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A microprocessor apparatus for providing intermediate results to a dependent micro instruction, the microprocessor apparatus comprising:

a result forwarding cache, configured to store the intermediate results that have not been entered as results into a register file;

result update logic, coupled to said result forwarding cache, configured to enter the intermediate results into said result forwarding cache, wherein the intermediate results are entered into said result forwarding cache prior to being entered as said results into said register file; and operand configuration logic, coupled to said result forwarding cache, configured to access the intermediate results and to provide an operand required by the dependent micro instruction, wherein said operand configuration logic provides said operand to the dependent micro instruction after the dependent micro instruction has accessed said register file.

2. The microprocessor apparatus as recited in claim 1, wherein the intermediate results have been generated by preceding micro instructions, but which have not yet been written as said results to corresponding operand registers in said register file for retrieval by following micro instructions.

3. The microprocessor apparatus as recited in claim 2, wherein said operand configuration logic configures said operand from the intermediate results in said result forwarding cache and provides said operand to the dependent micro instruction prior to execution of the dependent micro instruction.

4. The microprocessor apparatus as recited in claim 3, wherein said result forwarding cache comprises cache buffers, each of said cache buffers corresponding to each of the intermediate results.

5. The microprocessor apparatus as recited in claim 4, comprising five cache buffers that correspond to five intermediate results generated by five preceding micro instructions.

6. The microprocessor apparatus as recited in claim 4, wherein said each of said cache buffers comprises:

a result field, for storing a corresponding intermediate result generated by execution of a corresponding preceding micro instruction;

a tag field, for identifying a corresponding operand register in said register file into which said corresponding intermediate result is to be entered; and a byte enable field, for designating bytes in said result field that are valid when said corresponding intermediate result is entered into said result forwarding cache.

7. The microprocessor apparatus as recited in claim 6, wherein said operand configuration logic configures said operand from selected cache buffers having tag field contents that each designate a first operand register in said register file, said first operand register corresponding to said operand.

8. The microprocessor apparatus as recited in claim 7, wherein said operand configuration logic concatenates the most recently entered and valid bytes from said selected cache buffers to form said operand.

9. The microprocessor apparatus as recited in claim 8, wherein said operand configuration logic simultaneously provides both said operand and a second operand to the dependent micro instruction.

10. An intermediate result cache for storing intermediate results of previously executed micro instructions, the intermediate result cache comprising:

result buffers, for storing the intermediate results, wherein the intermediate results are stored prior to being entered into a register file;

a result selector, coupled to said result buffers, for determining selected byte locations within selected result buffers that are used to configure an operand for a dependent micro instruction; and     operand configuration logic, coupled to said result selector and said result buffers, for retrieving bytes from said selected byte locations within said selected result buffers to configure said operand, and wherein said operand is provided to said dependent micro instruction subsequent to said dependent micro instruction accessing said register file.

11. The intermediate result cache as recited in claim 10, wherein said operand configuration logic configures said operand and provides said operand to said dependent micro instruction after said dependent micro instruction has accessed an operand register in said register file and prior to execution of said dependent micro instruction.

12. The intermediate result cache as recited in claim 11, further comprising:

tag buffers, coupled to said result buffers, each of said tag buffers designating a corresponding register in said register file within which a corresponding intermediate result is to be entered; and     valid byte indicators, coupled to said result buffers, each of said valid byte indicators indicating which bytes in a corresponding intermediate result buffer are valid upon entry of said corresponding intermediate result;

wherein the number of said result buffers, said tag buffers, and said valid byte indicators correspond to intermediate results generated by five previously executed micro instructions.

13. The intermediate result cache as recited in claim 12, wherein said five previously executed micro instructions are x86-compatible micro instructions.

14. The intermediate result cache as recited in claim 12, wherein each time a most recently generated intermediate result is entered into a most recently generated intermediate result buffer, contents of the intermediate result cache are shifted such that a least recently generated intermediate result is shifted out of a least recently generated intermediate result buffer.

15. The intermediate result cache as recited in claim 14, wherein said result selector determines said selected result buffers based upon contents of corresponding selected tag buffers which each designate said operand register.

16. The intermediate result cache as recited in claim 15, wherein said operand configuration logic concatenates the most recently entered and valid bytes from said selected result buffers to form said operand.

17. The intermediate result cache as recited in claim 16, wherein said operand configuration logic simultaneously provides both said operand and a second operand to said dependent micro instruction.

\* \* \* \* \*